Figure 1:
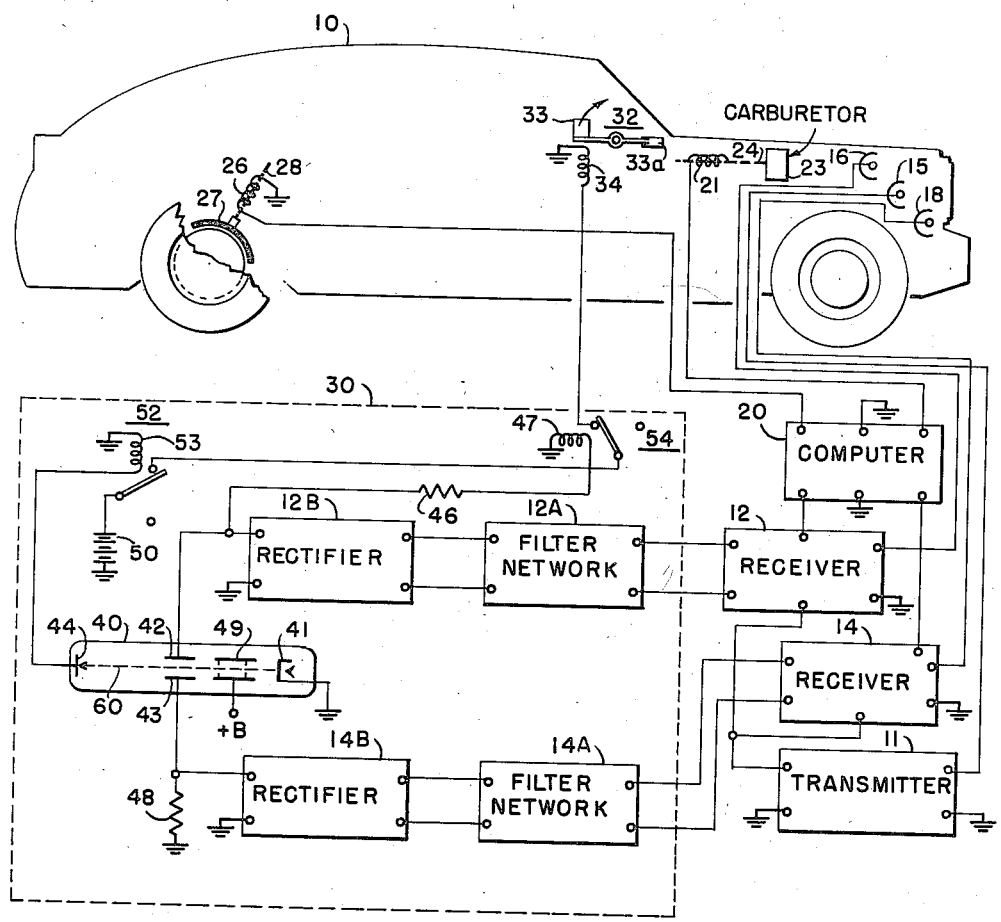

July 1, 1958   K. McILWAIN   2,841,782
EQUIPMENT MONITORING APPARATUS FOR RADAR SYSTEM
Filed June 15, 1954

United States Patent Office 2,841,782
Patented July 1, 1958

2,841,782

EQUIPMENT MONITORING APPARATUS FOR RADAR SYSTEM

Knox McIlwain, Huntington, N. Y., assignor to Hazeltine Research, Inc., Chicago, Ill., a corporation of Illinois Application June 15, 1954, Serial No. 436,805

3 Claims. (Cl. 343—5)

General

This invention is at present particularly useful in equipment monitoring apparatus for a vehicle collision-prevention radar system for enabling automatic deceleration of a moving vehicle in accordance with its proximity to head-on objects. However, it is capable of use wherever it is desired to monitor highly directional equipment of the kind described below.

In moving vehicles, for example, it would be desirable to supplement or replace the operator's reaction time by an automatic device for decelerating the vehicle when it approaches too close to head-on objects. In a collision-prevention radar system for achieving this purpose, it is imperative that the operator be aware of the fact whenever any of the radar equipment is not operating properly. In order to achieve this result, the equipment must be monitored in some manner and the monitoring apparatus must, in addition to monitoring the radar equipment, also be capable of monitoring itself.

It is an object of the invention, therefore, to provide new and improved monitoring apparatus for monitoring a radar system to warn the operator of equipment failure.

It is another object of the invention to provide new and improved monitoring apparatus for monitoring the signal-translating characteristics of the receiver apparatus of a collision-prevention radar system to warn the operator of a substantial change therein.

It is a further object of the invention to provide new and improved equipment monitoring apparatus for monitoring itself as well as the other equipment of a collision-prevention radar system to warn the operator of equipment failure.

In accordance with the invention, in a radar system having transmitter and receiver apparatus for enabling automatic deceleration of a moving vehicle in accordance with its proximity to head-on objects, equipment monitoring apparatus for warning the operator of equipment failure comprises supply-circuit means for supplying receiver signals representative of reflected energy received in response to energy radiated from the transmitter apparatus, the amplitude of the signals being dependent on the translation characteristics of the receiver apparatus. The monitoring apparatus further includes an electron-discharge device having a cathode, a pair of deflection electrodes, and an anode, the deflection electrodes being coupled to the receiver-signal supply-circuit means. The monitoring apparatus additionally includes signaling apparatus for indicating equipment failure. The apparatus further includes a first control device coupled to the anode and responsive to the anode current of the electron-discharge device for controlling the operation of the signaling apparatus, and a second control device coupled to the receiver-signal supply-circuit means and responsive to at least one of the receiver signals for controlling the operation of the signaling apparatus.

For a better understanding of the present invention, together with other and further objects thereof, reference is had to the following description taken in connection with the acompanying drawing, and its scope will be pointed out in the appended claims.

Figure 2:
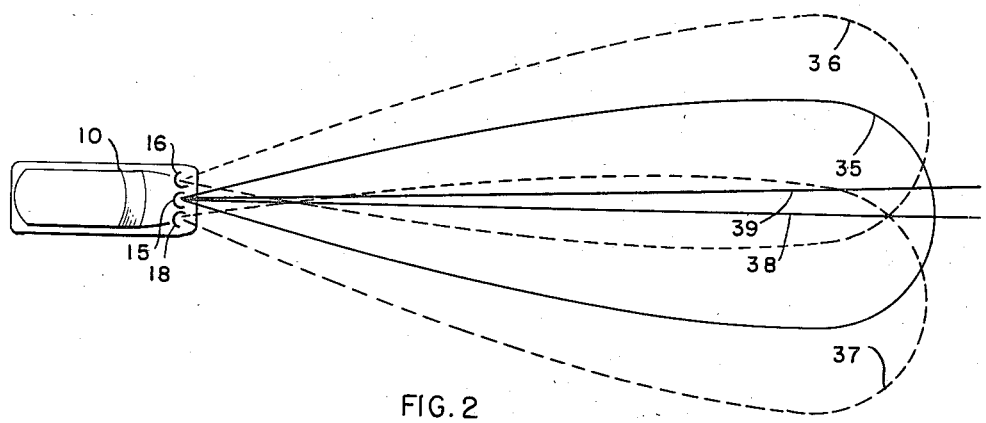

Referring to the drawing:

Fig. 1 is a circuit diagram, partly schematic, of a complete collision-prevention radar system including equipment monitoring apparatus constructed in accordance with the present invention, and Fig. 2 is a plan view of an automobile and adjacent roadway showing the shape and position of the transmitter and receiver antenna patterns of the radar system.

Description of collision-prevention radar system

Referring to Fig. 1 of the drawing, the collision-prevention radar system there represented and mounted on an automobile 10 includes a transmitter 11 and a pair of receivers 12 and 14. The transmitter 11 is, for example, of the frequency-modulated radar type while each of the receivers 12 and 14 is also, for example, of the frequency-modulated type for developing signals representative of the distance from the radar equipment to another object. The transmitter 11 is coupled to each of the receivers 12 and 14 for supplying directly to each of the receivers a portion of the signal being transmitted.

The transmitter 11 is also coupled to a conventional radar antenna 15 preferably located in the forward portion of the automobile 10. The receiver 12 is coupled to a conventional radar receiving antenna 16 located, for example, on the left side of the forward portion of the automobile 10 while the receiver 14 is coupled to another radar receiving antenna 18 located, for example, on the right side of the forward portion of the automobile 10. The transmitting antenna 15 is aimed straight ahead of the automobile while the receiving antenna 16 and 18 are aimed off at slight angles towards the corresponding sides of the roadway to enable the received signals to be jointly representative of the direction of the object giving rise to the signals as described in United States Patent No. 2,637,028 of K. McIlwain, entitled "Radiated-Signal Direction Finder," granted April 28, 1953.

The output circuits of each of the receivers 12 and 14 are coupled to a computer 20 of conventional construction for converting the distance signals to suitable control signals. One output circuit of the computer 20 may be coupled to a solenoid control winding 21 associated with a carburetor 23 of the automobile 10, which winding is coupled by suitable mechanical means, as indicated by the dashed line 24, to the carburetor 23 for regulating the flow of gasoline therethrough. Another output circuit of the computer 20 may be coupled to a solenoid control winding 26 associated with the braking mechanism 27 of the automobile 10, the solenoid winding 26 being coupled to the braking mechanism 27 by suitable mechanical means, as indicated by dashed line 28, for controlling operation of the braking mechanism 27.

The output circuits of each of the receivers 12 and 14 are also coupled to equipment monitoring apparatus including control-circuit means 30 and signaling apparatus 32 constructed in accordance with the present invention as will be more fully explained hereinafter.

Operation of collision-prevention radar system

Considering briefly the general operation of the above-described collision-prevention radar system, the transmitter 11 supplies a radio-frequency signal of the frequency-modulated type to the transmitting antenna 15. The transmitting antenna 15 is effective to radiate the radio-frequency signal energy ahead of the automobile 10 in a pattern as indicated by the area within the balloon-shaped curve 35 of Fig. 2. If any of this radiated signal energy strikes a substantial object such as another automobile, part of this signal energy is reflected back toward the automobile 10 and is intercepted by the receiving antennas 16 and 18. The transmitter 11 also supplies a portion of the signal being transmitted to each of the receivers 12 and 14 by means of the direct coupling shown in Fig. 1.

For antennas of convenient size and shape, the signal energy radiated by the transmitting antenna 15 covers undesired areas of the roadway and thereby enables undesired reflected signals to be produced. To minimize this result and enable utilization of antennas of convenient size, two independent receiving antennas 16 and 18 and corresponding receivers 12 and 14 may be utilized. The response pattern of receiving antenna 16 is indicated by the dashed line balloon-shaped curve 36 of Fig. 2 while the response pattern of receiving antenna 18 is indicated by the dashed line balloon-shaped curve 37 of Fig. 2. An antenna response pattern represents the variation of the signal supplied by the antenna to a receiver as the direction of the signal source is varied with respect to the antenna. As indicated by the response pattern 36 for antenna 16, for example, a signal of maximum magnitude is supplied to receiver 12 when the signal source is straight ahead of the antenna 16 while essentially no signal is supplied to receiver 12 when the signal source is at right angles to the forward direction of the antenna 16.

As mentioned, each of the receiving antennas 16 and 18 is not aimed straight ahead of the automobile 10 but rather is aimed off at a slight angle towards its corresponding side of the roadway. Thus, as indicated by the response patterns, the reception of reflected signal energy by the receivers 12 and 14 is of equal intensity for objects lying dead ahead of the automobile 10 along the line 38. For objects lying at an angle with respect to the direction of travel of the automobile 10, such as in the direction of line 39, the intensities of the signals supplied by the antennas to their respective receivers are unequal, the intensity of the signal supplied by the antenna 16 having increased while that supplied by the antenna 18 has decreased.

Each of the receivers 12 and 14 beats the reflected signal supplied by its antenna with the portion of the signal then being transmitted which is supplied directly to the receiver by the transmitter 11 to develop a beat signal the frequency of which is representative of the distance between the automobile 10 and the reflecting object. The beat signal is then converted by a conventional frequency-responsive circuit within the receiver to a direct-current signal the amplitude of which is dependent on the frequency of the beat signal and, thus, is representative of the distance between the automobile 10 and the reflecting object.

The distance signals from each of the receivers 12 and 14 are supplied to the computer 20, the only difference in the two signals being that their amplitudes with respect to each other vary in accordance with the direction of the reflecting object. This amplitude difference enables the computer 20 to distinguish between objects lying straight ahead of the automobile 10 and those lying at angles thereto. As a result, the computer 20 may be constructed in a manner similar to that described in the McIlwain patent to ignore signals from objects lying at angles differing by more than a small amount from the direction of travel of the automobile 10. In this manner, the collision-prevention radar system responds only to head-on objects lying essentially straight ahead of the automobile 10 and, thus, ignores undesired indications from other objects such as automobiles in the adjacent lane. In order to prevent erroneous indications when the automobile 10 is rounding a curve, the transmitting and receiving antennas may be mounted to turn with the turning of the front wheels of the automobile 10 so that the effective beam of transmitted energy is swung around the curve ahead of the automobile.

The computer 20, in response to the distance signals, supplies control signals to the solenoid control winding 21 to adjust the carburetor 23 in accordance with the proximity of the automobile 10 to head-on objects in such a manner as to decrease the flow of gas to the engine as the automobile 10 gets closer to a head-on object within a suitable distance range. The computer 20 likewise supplies control signals to the solenoid control winding 26 for actuating the braking mechanism 27 in a similar manner.

Each of the receivers 12 and 14 supplies to the control-circuit means 30 individual signals indicative of the operating condition of the corresponding receiver. The control-circuit means 30 utilizes these signals to actuate the signaling apparatus 32 whenever the signals depart from their desired value. In this manner, the operator of the automobile 10 is warned of any defects in the transmitting or receiving apparatus of the radar system.

*Description of equipment monitoring apparatus*

Referring now to Fig. 1 of the drawing, there is represented in a collision-prevention radar system equipment monitoring apparatus for warning the operator of equipment failure comprising supply-circuit means for supplying receiver signals representative of reflected energy, for example, ground-reflected energy originally radiated from the transmitter apparatus 11, 15 to the ground immediately below transmitting antenna 15. Such supply-circuit means for supplying receiver signals may include, for example, the output circuits of each of the receivers 12 and 14 which are coupled to the control-circuit means 30.

The monitoring apparatus also includes control-circuit means 30 coupled to the supply-circuit means, specifically to receivers 12 and 14, and responsive to the receiver signals for developing a control signal. The control-circuit means 30 includes an electron-discharge device 40 having a cathode 41, a beam-forming anode 49, a pair of deflection electrodes 42 and 43, and a collector anode 44. The deflection electrodes 42, 43 which are located on opposite sides of the electron beam 60 emerging from anode 49 are coupled to the receivers 12 and 14. The receiver 12 is additionally coupled through a resistor 46 and relay winding 47, which are coupled to deflection electrode 42, to ground while the receiver 14 is also coupled through a resistor 48, connected to deflection electrode 43, to ground. The control-circuit means 30 also includes circuit means for supplying to signaling apparatus 32 energizing current which means may be, for example, a battery 50. The control-circuit means 30 further includes a first control device, for example, an electromagnetic relay 52 having a control winding 53 coupled to the collector anode 44 and responsive to the beam current of the electron-discharge device 40 for controlling the delivery of the energizing current to the signaling apparatus 32. The control-circuit means 30 also includes a second control device, for example, an electromagnetic relay 54 having the control winding 47 coupled to the receiver 12 and responsive to at least one of the receiver signals for controlling the delivery of the energizing current to the signaling apparatus 32.

The equipment monitoring apparatus additionally includes signaling apparatus 32 responsive to the anode current of the electron-discharge device 40 for indicating equipment failure. The signaling apparatus may include, for example, a gravity-actuated mechanical warning flag 33 attached to the dashboard of the automobile 10 as shown in Fig. 1 and normally maintained in a non-warning position by means of a solenoid control winding 34.

Filters 12A and 14A are provided to exclude from control-circuit means 30 higher beat frequencies due to waves reflected from head-on objects; they pass, however, the lower frequency beat signals due to waves reflected from the ground directly below. Rectifiers 12B and 14B may be provided to develop direct-current potentials for application to the device 40.

Operation of equipment monitoring apparatus

Considering the operation of the equipment monitoring apparatus just described, the apparatus must be capable of monitoring the operating condition of the transmitter 11, the receivers 12 and 14, and the equipment monitoring apparatus itself. It is also necessary, in a highly directional radar system of the type under consideration, that the monitoring apparatus be capable of indicating the relative signal-translating abilities of the two receivers 12 and 14 in order that the operator may know that the differences in magnitude of the distance signals of the respective receivers are caused solely by the reflecting object not lying straight ahead of the automobile and are not caused by the receivers having unequal signal-translating characteristics. These functions may be performed by utilizing a signal that is representative of the operating condition of the transmitter 11 and receivers 12 and 14 as well as the signal-translating characteristics of the receivers 12 and 14.

In a frequency-modulated type of radar system, a signal of this nature is normally produced by a portion of the energy originally transmitted from the transmitting antenna 15 which is reflected back to the receiving antennas 16 and 18 by nearby objects such as the adjacent portions of the roadway or the vehicle itself. This ground-reflected energy is comprised, for the most part, of energy reflected from the roadway directly below the transmitting antenna 15. Because this distance is so short, the frequency of the ground-reflected energy is very nearly the same as the instantaneous frequency of the frequency-modulated transmitted energy and is thus effective to produce very low frequency beat-signal components in each of the receivers 12 and 14. Such low frequencies are substantially below the higher beat frequencies caused by reflections from head-on objects because the distance to the latter is much greater than the distance to the roadway directly below. Consequently, the beat frequencies due to head-on objects can easily be separated from those due to the roadway directly below by appropriate filters. These beat-signal components represent alternating signals of a few cycles per second which should be equal in each of the receivers 12 and 14 provided the signal-translating characteristics of each of the receivers are equal.

There are several choices as to the manner in which these low-frequency beat-signal components may be supplied to the control-circuit means 30. They might, for example, be supplied directly, the higher beat-frequency signal components due to head-on objects being blocked by filters 12A and 14A as shown in Fig. 1. The low-frequency beat-signal components after filtering may also, for example, be rectified as by units 12B and 14B so that only direct-current signals are supplied to the deflection electrodes 42, 43 of the electron-discharge device 40.

For the receiver 12 the low-frequency beat-signal components supplied thereby, for example, to the control-circuit means 30 depend on the signal-translating characteristics of the receiver itself. Additionally, these beat-signal components are representative of the operativeness of the receiver 12. Furthermore, these beat-signal components are also indicative of whether or not the transmitter 11 is functioning. The beat-signal components supplied by the other receiver 14 convey similar information with respect to that receiver.

The low-frequency beat-signal components from the receiver 12 are supplied to the deflection electrode 42 of the electron-discharge device 40 while the low-frequency beat-signal components supplied by the receiver 14 are supplied to the deflection electrode 43 of the electron-discharge device 40. If both of these sets of beat-signal components are of equal magnitude and, where rectifiers 12B and 14B are not used, in the same phase, then the electron beam within the device 40, as indicated by the dashed line 60, will strike the anode 44 thus producing an anode current which is effective to energize the winding 53 of the relay 52 to hold that relay switch closed so that energizing current from the battery 50 is supplied to the signaling apparatus 32 to keep the warning flag 33 in the nonwarning position as shown in Fig. 1. If, however, the signal-translating characteristics of either of the receivers change, the corresponding beat-signal components supplied to the deflection electrodes are effective to deflect the electron beam away from the anode 44, thus, causing the relay 52 to open and enable the weight 33a to raise the warning flag 33. That the electron beam strikes the anode 44 is also indicative of whether or not the electron-discharge device 40 is itself operating. In the absence of such electron current, the relay 52 opens and causes the signaling device 32 to give a warning.

If the transmitter 11 is totally inoperative or both of the receivers 12 and 14 are totally inoperative, then no beat-signal component is supplied to either of the deflection electrodes and, hence, the electron beam is not deflected from the anode 44. The absence of a beat-signal component being supplied to the electrode 42 and, hence, flowing through the resistor 46 and relay control winding 47 is effective, however, to cause the switch of relay 54 to open, thus preventing the battery 50 from supplying energizing current to the signaling apparatus 32. In this manner, the operator is apprised of the fact that either the transmitter or both receivers are inoperative. In the event that one receiver is functioning properly and the other receiver is totally inoperative, then the beat-signal components supplied to the deflection electrodes are of unequal magnitude causing the electron beam to be deflected from the anode 44 and thus causing the signaling apparatus 32 to give a warning. Additionally, should the battery 50 fail or an open circuit develop in the wire carrying the battery energizing current to the signaling apparatus 32, the signaling apparatus 32 gives immediate warning of the failure.

From the foregoing description, it will be apparent that equipment monitoring apparatus constructed in accordance with the present invention has the advantages that it is capable of monitoring the transmitting and receiving apparatus of a collision-prevention radar system to warn the operator of equipment failure therein or in the monitoring apparatus itself.

Although the invention has been described in a collision-prevention system for automotive vehicles, it should be understood that it may be used wherever the dual receiving antenna pattern of Fig. 2 is employed in highly directional equipment aimed at faraway objects so long as there is a nearby surface from which low beat-note reflections can be received. For example, it may find application in aircraft or at sea where such reflections can be had from the wings of an aircraft or the deck of a ship.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a collision-prevention radar system having a transmitter and a pair of receivers for enabling automatic deceleration of a moving vehicle in accordance with its proximity to head-on objects, equipment monitoring apparatus for warning the operator of equipment failure comprising: first supply-circuit means for supplying a first receiver signal representative of ground-reflected energy received in response to energy radiated from said transmitter and picked up by a first of said receivers;

second supply-circuit means for supplying a second receiver signal representative of ground-reflected energy received in response to energy radiated from said transmitter and picked up by a second of said receivers; the amplitude of each of said first and second receiver signals being dependent on the translation characteristics of the receiver through which it is translated; an electron-discharge device having a cathode, a pair of deflection electrodes, and an anode, one of said deflection electrodes being coupled to said first receiver-signal supply-circuit means and a second of said deflection electrodes being coupled to said second receiver-signal supply-circuit means, said deflection electrodes being jointly responsive to said receiver signals for controlling the anode current of said electron-discharge device in accordance with the difference in the output signals of said receivers; signaling apparatus for indicating equipment failure; a first relay coupled to said anode and responsive to the anode current of said electron-discharge device for controlling the operation of said signaling apparatus; and a second relay coupled to said receiver-signal supply-circuit means and responsive to at least one of said receiver signals for also controlling the operation of said signaling apparatus.

2. In a collision-prevention radar system having transmitter and receiver apparatus for enabling automatic deceleration of a moving vehicle in accordance with its proximity to head-on objects, equipment monitoring apparatus for warning the operator of equipment failure comprising: supply-circuit means for supplying receiver signals representative of reflected energy received in response to energy radiated from said transmitter apparatus, the amplitude of the signals being dependent on the translation characteristics of said receiver apparatus; an electron-discharge device having a cathode, a pair of deflection electrodes, and an anode, said deflection electrodes being coupled to said receiver-signal supply-circuit means; signaling apparatus for indicating equipment failure; a first control device coupled to said anode and responsive to the anode current of said electron-discharge device for controlling the operation of said signaling apparatus; and a second control device coupled to said receiver-signal supply-circuit means and responsive to at least one of said receiver signals for controlling the operation of said signaling apparatus.

3. In a collision-prevention radar system having transmitter and receiver apparatus for enabling automatic deceleration of a moving vehicle in accordance with its proximity to head-on objects, equipment monitoring apparatus for warning the operator of equipment failure comprising: supply-circuit means for supplying receiver signals representative of reflected energy received in response to energy radiated from said transmitter apparatus, the amplitude of the signals being dependent on the translation characteristics of said receiver apparatus; an electron-discharge device having a cathode, a pair of deflection electrodes, and an anode, said deflection electrodes being coupled to said receiver-signal supply-circuit means; signaling apparatus for indicating equipment failure; circuit means for supplying signaling apparatus energizing current; a first relay coupled to said anode and responsive to the anode current of said electron-discharge device for controlling the delivery of said energizing current to said signaling apparatus; and a second relay coupled to said receiver-signal supply-circuit means and responsive to at least one of said receiver signals for also controlling the delivery of said energizing current to said signaling apparatus.

References Cited in the file of this patent

UNITED STATES PATENTS

| | | |
|---|---|---|
| 2,393,624 | Ferrill | Jan. 29, 1946 |
| 2,509,331 | Brannen | May 30, 1950 |
| 2,533,898 | Robinson | Dec. 12, 1950 |
| 2,637,028 | McIlwain | Apr. 28, 1953 |